April 13, 1971 G. A. SPECKEN 3,574,754
CONTINUOUS PROCESS FOR PRODUCTION OF PRIMARY AMINES
Filed Nov. 15, 1967
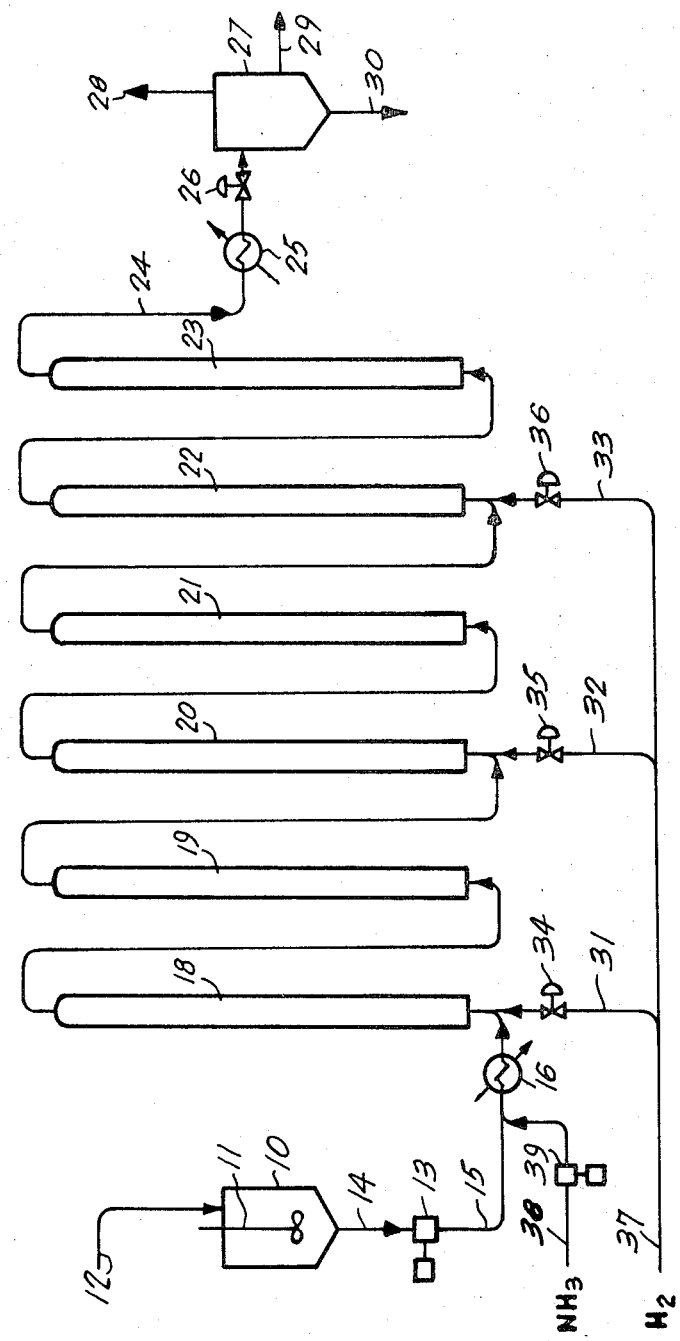
*INVENTOR*
Gerald A. SPECKEN

3,574,754
CONTINUOUS PROCESS FOR PRODUCTION OF PRIMARY AMINES
Gerald A. Specken, % Chemcell, Ltd., P.O. Box 99, Edmonton, Alberta, Canada
Filed Nov. 15, 1967, Ser. No. 683,361
Int. Cl. C07c 85/12
U.S. Cl. 260—583     7 Claims

ABSTRACT OF THE DISCLOSURE

A process for the hydrogenation of nitriles for obtaining high yield of primary amines where only a fraction of the hydrogen is deliverd at a time. The hydrogen is fed as continuous flows. Each flow is introduced along the reaction zone generally at regular intervals.

---

This invention relates to a continuous process for the production of primary amines by the catalytic hydrogenation of nitriles.

Ever since it was first discovered that the amines could be produced by the hydrogenation of nitriles, there have been numerous improvements for increasing the yield of primary amines while reducing the side reactions producing secondary and tertiary amines. Among the most successful improvements are those comprising the addition of ammonia, lower alkyl amines or substances yielding hydroxyl ions to the nitrile feeds, or those involving the recycling of primary or secondary amines to the reaction zone. Despite these refinements to limit the production of secondary and tertiary amines during the hydrogenation of nitriles to primary amines, the processes remain expensive and/or overly complicated.

It has now been found that the continuous catalytic hydrogenation of nitrile to primary amine may be improved if a portion only of the hydrogen required for a complete reduction of the nitrile, is added as a continuous flow near the input into the reaction zone. The additional quantities of hydrogen are introduced as successive flows into the remaining portion of the reaction zone. According to the invention, the yield of primary amine is increased while the production of secondary and tertiary amines decreases and even becomes negligible. Under optimum conditions it has been possible to obtain yields as high as 98% and above of primary amine with respect to the nitrile content of the feed.

In order to attain a high yield of primary amine, in a preferred embodiment according to the invention, nitriles having from 8 to 20 carbon atoms, ammonia and the catalyst are fed under pressure in a continuous manner as a hot liquid phase. A fraction only of the required hydrogen is allowed to react. Additional portions of the hydrogen necessary to complete the reduction are then introduced as continuous flows into subsequent points in the system along the flow of the liquid phase.

The nitriles which may be used in accordance with the invention are saturated or unsaturated nitriles and preferably nitriles containing 8 to 20 carbon atoms per molecule. Such nitriles can be prepared by the ammonolysis of fatty acids or fatty esters of vegetable and animal sources, such as tallow, peanut oil, soy bean oil, lard oil, castor oil, coconut oil, palm oil, lard, fish oils. According to the present invention, the hydrogenation of nitriles may be carried out in the presence of any of the commonly used nitrile hydrogenation catalysts, such as Raney nickel, platinum on char, palladium on char, platinum and cobalt oxide. Catalyst supports other than char may also be used. The catalyst may either be a fixed, fluidized or slurried bed. Active Raney nickel catalyst is preferred. In the case of a slurried bed containing Raney nickel power, 0.5 to 5% and higher, based upon the nitrile feed, may be used; the preferred range is 1 to 2%.

To prevent the formation of secondary and tertiary amines and to improve the production of primary amines, ammonia is required in an amount which may vary from about 0.5 to 8 moles and more per mole of nitrile; the preferred range is 1.5 to 2. In accordance with the invention, the pressure may vary between 500 to 1100 p.s.i., and the temperature between 50° C. and 200° C., although the pressure is usually set at 500–700 p.s.i. The reaction is preferably carried out at 120° C. to 140° C. under about 600 p.s.i.

The amount of hydrogen added into the reaction zone should be equal to at least the amount required to saturate the nitrile groups, plus some excess to force the reaction to completion. The preferred amount of hydrogen is 120% to 180% of that required for the saturation of the nitrile group—i.e. 120%–180% times two moles of hydrogen per mole of nitrile. However, it is essential to the invention that the total amount of hydrogen be introduced into the reaction as several continuous flows at different points located along the entire length of the reaction zone. Thus, if "$n$" is the number of hydrogen inlets, the amount of hydrogen used in each inlet is preferably 120–180% times the hydrogen required for saturation divided by $n$. In the case of tallow nitrile, it has generally been found most satisfactory to use three hydrogen inlets with the other preferred reaction conditions prevailing.

Having thus generally described the invention, it will now be referred to in more detail by reference to the accompanying drawing in which the particular apparatus used has been designed to stimulate a plug flow isothermal reaction system. Any other apparatus could be used as long as provision is made to control the reaction conditions as specified.

The drawing is a diagram illustrating a mixer and the reactor assembly which may be used to carry out the invention.

Referring now to the drawing the apparatus includes a tank 10, equipped with a heating jacket, not shown, adapted to receive a suitable heating fluid for maintaining the tank and its content at a desired temperature. The tank is provided with an internal agitator 11 and a feeding line 12 through which the nitrile is delivered to the tank 10. A positive displacement feed pump 13 is connected to the tank via 14, and via 15 to lead the material of the tank into a preheating zone 16 and into the first reaction chamber 18.

The reactor assembly comprises six jacketed, vertical, tubular, slurry reactors 18 to 23 connected in series. A thermocouple, not shown, is located near the outlet of each reactor, for recording the temperature of the reaction. The material in the last reactor 23 is carried out via 24 into a cooler 25 which conveniently lowers the temperature thereof, above the melting point of the amine. The device further comprises a pressure control value 26 mounted along line 24 between the cooler 25 and a vent-receiver 27 which is used to separate gases which are vented at point 28, and to recover the liquid, and the catalyst at points designated respectively as 29 and 30.

Hydrogen is fed to the apparatus through three high pressure inlets 31, 32 and 33 respectively provided with control valves 34, 35 and 36 to control the admission of $H_2$ at the bottom of each reactor 18, 20 and 22. The three inlets 31, 32 and 33 are connected to a hydrogen supply via 37.

A high pressure ammonia feed line 38 equipped with a positive displacement feed pump 39 is connected to 15.

Each hydrogen inlet is preferably spaced from the others so that the hydrogen delivered at one inlet is largely reacted with nitrile before the total stream reaches the next hydrogen inlet, aiming thus at maintaining an amount of hydrogen sufficient to reduce the nitrile while keeping the ratio of hydrogen to ammonia as low as possible.

OPERATION

The fatty nitrile which is fed by 12, and the catalyst which is introduced directly into the tank are first mixed in the tank 10 at a temperature which is above the melting point of the nitrile. For nitriles having 8 to 20 carbon atoms, a temperature of 100° C. to about 110° C. is convenient. The catalyst-nitrile slurry is then pumped against the pressure of the reaction system, mixed with high pressure liquid ammonia, and heated in the preheating zone to a temperature close to the reaction temperature, which may vary according to reaction conditions. The preheated feed is then mixed with a metered stream of high pressure hydrogen, measured by any known means, not shown, introduced into the bottom of the first reactor and carried through the six reactors in a series. As the liquid stream enters the third and fifth reactor, further portions of hydrogen, under pressure, are further added. During the reaction, the reactor jackets are fed with a suitable heat exchange medium such as dipropylene glycol. On leaving the last reactor, the hydrogenated products are cooled above the melting point of the amine products, generally between 60° C.–100° C., the pressure is decreased across the pressure control valve 26, and finally, the mixture is discharged into the vent-receiver 27. The amine is collected as a liquid, the excess hydrogen and ammonia escapes as gas, and the catalyst particles are collected as they settle at the bottom of the liquid.

Example I

Into a tank of the type illustrated in the drawing, there is fed a mixture of tallow nitriles having an average molecular weight of 265, and 1% by weight of the nitriles of powdered No. 28 Raney nickel active catalyst. Both the catalyst and the nitriles are well slurried, heated at a temperature of 100° C.–110° C. The mixture is delivered under pressure with 2.2 moles of ammonia per mole of nitrile at the rate of 320 grams of nitrile per minute. The resulting feed is preheated before reaching the first reactor. Near the inlet of the first reactor, hydrogen is delivered at a rate of 1.0 mole per mole of nitrile. The reactants proceed through each reactor in series as an upward flow of both liquid and gas phases in each reactor. Near the inlets of the third and fifth reactors, a stream of metered liquid hydrogen is further added at the rate of 0.94 mole per mole of nitrile per inlet. The average temperature at the outlet of each reactor is recorded as seen in Table I. During the reaction, dipropylene glycol is fed into the jacket of each reactor to maintain a proper temperature throughout the system.

The product is then collected as indicated above. The analysis reveals that the end product contains 98.6% primary amines, 2.6% secondary amines and 0.4 tertiary amines based on the total weight of the amines. An infra red analysis of the product mixture shows no nitrile band, which indicates that the reaction was completed.

The ratio of primary to secondary and tertiary amine is thus 32.8.

Examples 2–6

Examples 2 and 3 were carried out in a similar way except that concentration ranges were different as tabulated in Table I.

Example 4 was carried out using only two hydrogen inlets. As a result, only 85.2% of primary amines was produced. Examples 5 and 6 were also carried out by using only two hydrogen inlets located near the entrance of the first and third reactor respectively and reaction products were extracted from reactors 5 and 3 respectively. The infra red analysis (IR) calculated in weight percent shows that in both cases the nitriles had not been completely hydrogenated and that the primary amines were obtained in lower quantity.

TABLE I

| | Example Number | | | | | |
|---|---|---|---|---|---|---|
| | 1 | 2 | 3 | 4 | 5 | 6 |
| Nitrile Feed, gm./min. | 320 | 340 | 322 | 308 | 308 | 308 |
| Percent Ra. Ni concentrate on weight of amine, percent. | 1 | 1 | 2 | 2 | 2 | 2 |
| $NH_3$ moles/mole of nitrile. | 2.18 | 1.45 | 2.17 | 2.18 | 2.18 | 2.18 |
| $H_2$ moles/mole of nitrile; Introduce to reactor | | | | | | |
| 1 | 1.03 | .88 | 1.02 | .98 | .98 | .98 |
| 3 | .94 | .97 | .93 | 1.96 | 1.37 | 1.57 |
| 5 | .94 | .88 | .93 | | | |
| Pressure p.s.i.g. minimum/maximum | 500/610 | 600/640 | 580/620 | 570/620 | 570/620 | 570/620 |
| ¹ Calculated residence time, minutes | 76 | 76 | 76 | 78 | 65 | 39 |
| Average temperature °C.; Exit reactor: | | | | | | |
| 1 | 122 | 124 | 122 | 124 | 126 | 122 |
| 2 | 121 | 121 | 122 | 125 | 122 | 121 |
| 3 | 124 | 127 | 127 | 127 | 124 | 124 |
| 4 | 101 | 107 | 116 | 123 | 122 | 122 |
| 5 | 118 | 118 | 116 | 119 | 121 | 121 |
| Product analysis; Amines weight percent based on total weight of amines | | | | | | |
| Primary | 98.6 | 97.6 | 97.3 | 85.2 | 80.3 | 84.8 |
| Secondary | 2.6 | 3.5 | 2.4 | 20.5 | 16.2 | 10.0 |
| Tertiary | 0.4 | 0.8 | 0.8 | 0.5 | 1.1 | 0.8 |
| Amide IR, weight percent | 0.6 | tr | | 0.5 | 2.7 | 0.8 |
| Nitrile IR, weight percent | | | | | 2.4 | 3.3 |
| Iodine No. cgm./gm. | 50.5 | 48.9 | 47.3 | 38.1 | 46.1 | 46.0 |
| Amine ratio, primary/sec plus tertiary | 32.8 | 22.7 | 30.4 | 4.1 | 4.6 | 7.8 |

¹ The residence time is calculated based on the assumption that liquid takes up the total reactor volume and the given numbers are thus maximum values only.

The following runs are now shown as typical examples to illustrate the yield in the production of primary amines if hydrogen is fed through a single inlet and may serve for comparison purposes.

TABLE II

| | Runs | | | |
|---|---|---|---|---|
| | 1 | 2 | 3 | 4 |
| Nitrile feed, gm./min | 320 | 320 | 255 | 320 |
| Percent Ra.Ni concentrate on weight of nitrile | 2.5 | 2.5 | 0.5 | 2.5 |
| $NH_3$ moles/mole of nitrile | 0.82 | 2.32 | 1.03 | 2.32 |
| $H_2$ input moles/mole of nitrile | 3.72 | 3.72 | 4.68 | 3.72 |
| Pressure p.s.i.g., minimum/maximum | 420/480 | 420/480 | 280/320 | 420/480 |
| | 480 | 480 | 320 | 480 |
| Calculated residence time, minutes | 84 | 76 | 103 | 51 |
| Average temperature (° C.); Exit reactor: | | | | |
| 1 | 120 | 122 | 119 | 122 |
| 2 | 127 | 111 | 120 | 107 |
| 3 | 125 | 105 | 119 | 102 |
| 4 | 115 | 100 | 114 | 99 |
| 5 | 116 | 99 | 115 | 99 |
| 6 | 122 | 98 | 114 | 98 |
| Product Analysis; Amines weight percent based on total weight amines: | | | | |
| Primary | 59.6 | 81.0 | 61.2 | 79.2 |
| Secondary | 30.9 | 18.0 | 28.3 | 17.2 |
| Tertiary | 3.3 | 2.1 | 6.5 | 2.3 |
| Amide IR | 1.0 | 0.7 | 3.0 | 1.0 |
| Nitrile IR | | | | |
| Iodine No. cgm./gm | 40.6 | 42.0 | 42.4 | 44.0 |
| Amine ratio, prim/sec-tertiary | 1.7 | 4.0 | 1.7 | 4.1 |

As it can easily be seen, the yields of primary amine have been raised from 59 to 81% to 97 and 98%, by using three hydrogen inlets, and to 85.2% by the use of two hydrogen inlets.

The embodiments of the invention in which an exclusive property or privilege is claimed are defined as follows:

1. A process for producing primary amines by the hydrogenation of a nitrile having from 8 to 20 carbon atoms per molecule, which process comprises:
   (a) feeding into a reactor a mixture of ammonia in an amount sufficient to inhibit formation of secondary and tertiary amines, at least one aliphatic nitrile having from 8 to 20 carbon atoms, and a hydrogenation catalyst at a temperature of from 50° C. to 200° C.
   (b) injecting hydrogen into the mixture in "$n$" portions, each portion being injected after the preceding portion has substantially reacted with the nitrile; the amount of hydrogen added in each portion being $E/n$ moles of hydrogen where E is at least the number of moles of hydrogen required to saturate all of the nitrile groups, and $n$ is an integer of at least 2.

2. A process according to claim 1, wherein $n$ is 3.

3. A continuous process for the hydrogenation of a nitrile to a primary amine comprising:
   (a) feeding under pressure into a reactor a mixture of at least one aliphatic nitrile having from 8 to 20 carbon atoms, ammonia in an amount sufficient to inhibit the formation of secondary and tertiary amines, and a hydrogenation catalyst at a temperature of from 50° C. to 200° C.;
   (b) injecting hydrogen into the mixture at $n$ points, each point being located at a distance from one another sufficient to permit substantial reaction of the nitrile with the hydrogen before reaching the next point, the amount of hydrogen added at each point being $E/n$ moles of hydrogen where E is at least the number of moles of hydrogen theoretically required to saturate all of the nitrile groups, and $n$ is an integer of at least 2.

4. A process according to claim 3, wherein $n$ is 3.

5. A process according to claim 3, wherein said hydrogenation catalyst is Raney nickel.

6. A process according to claim 3, wherein E is from 1.2 to 1.8 times the amount of hydrogen required for saturation of the nitrile groups.

7. A process according to claim 3, wherein said nitrile is a tallow nitrile.

References Cited
UNITED STATES PATENTS 3,461,167  8/1969  Buehler et al. ____ 260—583(K)
3,418,375  12/1968  Schmitt et al. ____ 260—583(K)

CHARLES B. PARKER, Primary Examiner

R. L. RAYMOND, Assistant Examiner

PO-1050
(5/69)

UNITED STATES PATENT OFFICE
CERTIFICATE OF CORRECTION

Patent No. 3,574,754    Dated April 13, 1971

Inventor(s) Gerald A. Specken

It is certified that error appears in the above-identified patent and that said Letters Patent are hereby corrected as shown below:

Please correct the following errors:

On page 1, column 2, line 65, replace "value" with --valve--.

On page 1, column 2, line 7, replace "power" with --powder--.

On page 3, column 5, Table II, line 13, after "Pressure p.s.i.g., minimum/" delete -- 420 420 280 420--.

Same Column 5, Table II, line 15, cancel "480 480 480 480".

Signed and sealed this 14th day of March 1972.

(SEAL)
Attest:

EDWARD M. FLETCHER, JR.
Attesting Officer

ROBERT GOTTSCHALK
Commissioner of Patents